(12) United States Patent
Zhu et al.

(10) Patent No.: US 8,039,528 B2
(45) Date of Patent: Oct. 18, 2011

(54) METHOD FOR THE MANUFACTURE OF PRESSURE SENSITIVE ADHESIVES

(75) Inventors: Dong-Wei Zhu, Shoreview, MN (US); Cheryl L. Moore, Afton, MN (US); James T. Wolter, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 686 days.

(21) Appl. No.: 11/576,931

(22) PCT Filed: Oct. 13, 2005

(86) PCT No.: PCT/US2005/036924
§ 371 (c)(1),
(2), (4) Date: Apr. 9, 2007

(87) PCT Pub. No.: WO2006/044590
PCT Pub. Date: Apr. 27, 2006

(65) Prior Publication Data
US 2009/0018274 A1    Jan. 15, 2009

Related U.S. Application Data

(60) Provisional application No. 60/620,083, filed on Oct. 19, 2004.

(51) Int. Cl.
*C08F 2/00* (2006.01)
*C09B 67/00* (2006.01)

(52) U.S. Cl. .......................... 523/333; 526/77
(58) Field of Classification Search .............. 526/77; 523/333
See application file for complete search history.

(56) References Cited

U.S. PATENT DOCUMENTS

| | | | |
|---|---|---|---|
| 4,242,500 A | 12/1980 | Franceschini | |
| 4,443,568 A | 4/1984 | Woo | |
| 4,693,776 A | 9/1987 | Krampe et al. | |
| 4,737,577 A | 4/1988 | Brown | |
| 4,751,087 A | 6/1988 | Wick | |
| 4,834,979 A | 5/1989 | Gale | |
| 4,874,830 A | 10/1989 | Kido et al. | |
| 4,929,717 A | 5/1990 | Chmelir | |
| 5,087,676 A | 2/1992 | Heider et al. | |
| 5,641,834 A | 6/1997 | Abbey et al. | |
| 6,004,578 A | 12/1999 | Lee et al. | |
| 6,024,976 A | 2/2000 | Miranda et al. | |
| 6,028,155 A | 2/2000 | Collins et al. | |
| 6,149,935 A | 11/2000 | Chiang et al. | |
| 6,365,178 B1 | 4/2002 | Venkateshwaran et al. | |
| 6,696,519 B2 | 2/2004 | Brown et al. | |
| 2002/0065381 A1 | 5/2002 | Lorah et al. | |

FOREIGN PATENT DOCUMENTS

| | | |
|---|---|---|
| CN | 1348963 | 5/2002 |
| CN | 1348964 | 5/2002 |
| DE | 10042543 | 8/2000 |
| JP | 52028585 | 3/1977 |
| WO | WO 01/44400 | 6/2001 |
| WO | WO 2004/022609 | 3/2004 |

*Primary Examiner* — Peter D Mulcahy

(57) ABSTRACT

A method for the manufacture of an adhesive id described, comprising: (A) Providing an initial reaction product of a solution polymerization reaction, the initial reaction product comprising polymer, unreacted polymerizable reactant, non-polymerizable material, and solvent; and (B) Purifying the initial reaction product by adding an oxidizing agent and a reducing agent to the initial reaction product and allowing the unreacted polymerizable reactant in the initial reaction product to further react, thereby providing a second reaction product comprising additional polymer and a lower level of unreacted polymerizable reactant than was present in the initial reaction product. Optionally, the method of the invention may further comprise: Precipitating the polymer from the second reaction product to provide a precipitated polymer, and separating the precipitated polymer from the remainder of the second reaction product, the precipitated polymer comprising a lower level of non-polymerizable material or unreacted polymerizable reactant or both non-polymerizable material and unreacted polymerizable reactant than was present in the second reaction product.

14 Claims, No Drawings

METHOD FOR THE MANUFACTURE OF PRESSURE SENSITIVE ADHESIVES

CROSS REFERENCE TO RELATED APPLICATIONS

This application is a national stage filing under 35 U.S.C. 371 of PCT/US2005/036924 filed Oct. 13, 2005, which claims priority from U.S. Provisional Application Ser. No. 60/620,083; filed Oct. 19, 2004, the disclosure of which is incorporated by reference in its/their entirety herein.

The present invention relates to a method for the manufacture of an adhesive having low concentrations of residual components.

BACKGROUND OF THE INVENTION

Adhesive compositions including one or more polymers are often used in the manufacture of medical products that are designed for use in contact with human skin. Adhesive wound dressings may include components to cover a wound, absorb fluids and/or deliver medicaments to the injured skin. Such dressings typically include an adhesive backing which may be applied directly to the skin to maintain the dressing in place over the injury. Additionally, transdermal patches have become an accepted means for the delivery of certain molecules through the layers of the skin, thus eliminating the need for injections. Transdermal patches include a drug dosage which may be stored in an appropriate medium and affixed to an adhesive coated backing. The backing on the transdermal patch is intended to be adhesively affixed to an area of human skin to place and hold the drug-carrying medium in direct contact with the skin and thereby promote the delivery of the drug through the skin. In some instances, the drug dosage may be directly incorporated into the adhesive used to secure the patch to the skin. Adhesive compositions used for securing medical products to human skin are preferably free of significant concentrations of unreacted materials such as residual monomer components, initiator materials, inhibitors or other agents. In addition to enhancing the adhesion, cohesion, stretch and/or adhesive tack of the adhesive, a low level of significant impurities in such adhesive formulations is also desired to avoid certain unwanted features in the final product, such as unpleasant odors or the like.

Adhesive polymers that have been prepared by conventional free radical solution polymerization generally include impurities, such as residual monomers, initiator materials, inhibitors or other agents. Although residual monomers may be removed from the adhesive polymer by use of scavenger (or scavenging) monomers, this method also requires the removal of the scavenger monomer and the polymers that result are generally not the same as the original adhesive polymer obtained during the primary polymerization reaction. Alternatively, impurities remaining after free radical solution polymerization may also be removed by multiple heating and evaporation steps which remove volatile components. But, this method may crosslink, gel or degrade the polymer and it is time consuming, costly, and relies upon the volatility of any impurities.

There is a need to provide clean, adhesive polymers prepared by free radical solution polymerization and to improve the ability to remove impurities from such adhesive polymers.

SUMMARY OF THE INVENTION

The invention provides a method for the manufacture of an adhesive. In some embodiments, the invention provides a method, comprising:

(A) Providing an initial reaction product of a solution polymerization reaction, the initial reaction product comprising polymer, unreacted polymerizable reactant, non-polymerizable material, and solvent; and (B) Purifying the initial reaction product by adding an oxidizing agent and a reducing agent to the initial reaction product and allowing the unreacted polymerizable reactant in the initial reaction product to further react, thereby providing a second reaction product comprising additional polymer and a lower level of unreacted polymerizable reactant than was present in the initial reaction product.

In another embodiment, the invention provides a method as defined above and further comprising the steps of (C) Precipitating the polymer from the second reaction product to provide a precipitated polymer; and (D) Separating the precipitated polymer from the remainder of the second reaction product, the precipitated polymer comprising a lower level of non-polymerizable material or unreacted polymerizable reactant or both non-polymerizable material and unreacted polymerizable reactant than was present in the second reaction product.

In still another embodiment, the invention provides a method for the manufacture of an adhesive, comprising:

(A) Providing an initial reaction product of a solution polymerization reaction, the initial reaction product comprising a copolymer of isooctyl acrylate and acrylamide, unreacted polymerizable reactant, non-polymerizable material, and solvent;

(B) Purifying the initial reaction product by adding an oxidizing agent and a reducing agent to the initial reaction product and allowing the unreacted polymerizable reactant in the initial reaction product to further react, thereby providing a second reaction product comprising additional polymer and a lower level of unreacted polymerizable reactant than was present in the initial reaction product; and (C) Precipitating the non-polymerizable material from the reaction product to provide a purified copolymer of isooctyl acrylate and acrylamide comprising less than about 200 ppm of unreacted isooctyl acrylate or acrylamide.

In one embodiment, the amount of acrylamide in the purified copolymer will be below the limit of detection.

The invention will be further understood by those skilled in the art upon consideration of the remainder of the disclosure, including the Detailed Description of the Preferred Embodiment and the appended claims.

DETAILED DESCRIPTION OF THE PREFERRED EMBODIMENT

The invention provides a process for the manufacture of solution polymerized polymers suitable for use as a medical adhesive. In one embodiment, the process of the invention provides acrylate copolymers having a reduced content of undesired reactant materials including reduced levels of unreacted polymerizable reactant material (e.g., monomers) as well as a reduced levels of non-polymerizable material.

As described herein, acrylate (or methacrylate) polymers of the invention are copolymers of a primary, alkyl acrylate (or alkyl methacrylate), monomer and an optional polar comonomer.

The primary, alkyl acrylate (or alkyl methacrylate), monomer or monomers of the above-defined acrylate (or methacrylate) polymer are selected to provide a tacky or tackifiable material upon polymerization. Representative examples of primary monomers which may be used in combination are alkyl acrylates, such as isooctyl, 2-ethylhexyl, n-butyl, ethyl, methyl, and dimethylhexyl, and alkyl methacrylates, such as lauryl, isodecyl, and tridecyl. In certain embodiments, the primary acrylate monomer will comprise a $C_4$-$C_{12}$ acrylic ester such as those selected from the group: isooctyl acrylate ("IOA"), 2-ethylhexyl acrylate, 2-methyl butyl acrylate, and butyl acrylate as well as combinations of two or more of the foregoing.

The adhesive compositions provided according to the invention generally comprise an acrylate (or methacrylate) copolymer. Typically, the compositions have an inherent viscosity greater than about 0.2 dL/g, sometimes greater than about 0.5 dL/g, comprising polymerized primary monomers and optional polar comonomer. Polar monomers suitable for use in accordance with this invention include those having hydroxyl, amide, or carboxylic, sulfonic, or phosphonic acid functionality. Representative examples include acrylamide, methacrylamide, N-vinyl-2-pyrrolidone, 2-hydroxyethylacrylate, 2-hydroxyethylmethacrylate, hydroxypropylacrylate, acrylic acid, methacrylic acid, pyrrolidonyl ethyl acrylate, and alkoxyethyl acrylates, such as 2-carboxyethylacrylate. In some embodiments, the amount by weight of polar monomer will not exceed about 40% of the total weight of all monomers in order to avoid excessive firmness of the final PSA product. Typically, polar monomer is incorporated to the extent of about 1% to about 20% by weight. In one embodiment the polar monomer is acrylamide.

In some embodiments, the copolymer can comprise the reaction product of primary and polar monomers and additional optional monomers which, when present, are included in the polymerization reaction in quantities that will not render the PSA composition non-tacky. The optional additional monomers may be added, for example, to improve performance, reduce cost, or for other purposes. Examples of such optional monomers include vinyl esters, such as vinyl acetate, vinyl chloride, vinylidene chloride, styrene, and macromonomers copolymerizable with the other monomers. Suitable macromonomers include polymethylmethacrylate, styrene/acrylonitrile copolymer, polyether, and polystyrene macromonomers. Examples of useful macromonomers and their preparation are described in U.S. Pat. No. 4,693,776 (Krampe et al.), the disclosure of which is incorporated herein by reference The copolymerization of the primary and polar monomers is accomplished by conventional free radical solution polymerization. Monomers are first dissolved in an organic solvent and subsequently polymerized utilizing a suitable free radical initiator which can be either thermally or photochemically activated. Suitable thermally activated initiators include azo compounds such as 2,2'-azobis(isobutyronitrile) and peroxides such as benzoyl peroxide. Suitable photochemically activated initiators include benzoin ethyl ether and 2,2-dimethoxy-2-phenyl acetophenone, for example. The amount of initiator present in the reaction mixture will generally be within the range from about 0.01% to about 5% by weight of the total polymerizable composition.

The organic solvent used in the free radical copolymerization of the adhesive polymer can be any organic liquid that is inert to the reactants and product and which will not otherwise adversely affect the reaction. Suitable solvents include, without limitation, ethyl acetate as well as mixtures of solvents such as ethyl acetate combined with varying amounts of toluene, isopropanol, methanol and the like. The amount of solvent used will generally comprise about 30 to 70% by weight of the total weight of all reactants and solvent.

Polymerization of primary and polar monomers is accomplished with the conversion of the monomers to provide an initial reaction product generally comprising an acrylate (or methacrylate) copolymer. This polymerization is referred to herein as the "main" polymerization reaction which may generally be accomplished within about 24 hours or less. While polymerization may be substantially completed within the foregoing time, non-polymerized impurities remain in the initial reaction product along with the desired polymer. Impurities will typically include unreacted polymerizable materials such as residual primary monomer(s) which are generally present in the initial reaction product at levels ranging from about 1% to 5%, as determined by gas chromatography, based upon the weight of the initial monomer charge. Impurities may also be present in the initial reaction product due to the presence of non-polymerizable materials in the main polymerization reaction. Non-polymerizable materials in the reaction product may comprise decomposed initiator material, inhibitors, raw material impurities, and other agents that generally do not react or become incorporated into the adhesive polymer.

The method of the present invention provides purification steps to reduce the level of impurities in the final adhesive polymer. The present method includes the addition of an oxidizing agent and a reducing agent to the initial reaction product to initiate a further polymerization of the unreacted monomers. Optionally, at least one precipitation step may also be included in the method. The polymerization of unreacted monomer and the precipitation step are effective in reducing the levels of both the polymerizable material (e.g., residual monomer) and the non-polymerizable materials in the initial reaction product to thereby provide a purified acrylate polymer.

As mentioned, the step of adding oxidizing agent and reducing agent to the initial reaction product is performed to reduce the level of polymerizable material present in the initial reaction product following the main polymerization reaction. The initial reaction product obtained from the main polymerization reaction will comprise the acrylate polymer, unreacted polymerizable material and non-polymerizable material, all of which are dissolved in a suitable solvent. The oxidizing agent and the reducing agent are selected to react with one another to generate a free radical capable of initiating further polymerization of the unreacted monomers and other polymerizable material present in the initial reaction product. The resulting polymer formed following the addition of the oxidizing agent and the reducing agent is typically the same polymer generated during the main polymerization reaction, i.e., it is formed from the same types of monomers and the amount of side reactions leading to other types of polymers or compounds is minimal. The step of adding oxidizing agent, adding reducing agent, and allowing the unreacted polymerizable reactant in the initial reaction product to further react, thereby providing a second reaction product comprising additional polymer is also referred to herein as a "purification reaction step." Suitable oxidizing agents include alkyl hydroperoxides, such as tertiary amyl hydroperoxide (TAHP) and tertiary butyl hydroperoxide (TBHP). Suitable reducing agents include alkylamines, Vitamin C and sodium formaldehydesulfoxide (SFS). An optional promoter may be included to aid in the subsequent reaction. Suitable promoters include transition metal salts such as vanadyl sulfate ($VOSO_4$) and ferrous sulfate ($FeSO_4$). Combinations of one or more oxidizing agent may be used in conjunction with combinations of one or more reducing agent and optionally in conjunction with one or more promoters. Although not wishing to be bound by theory, it is believed that a reaction occurs between the oxidizing agent and the reducing agent to generate a powerful free radical capable of reacting the remaining polymerizable material to a level beyond that achieved during the conventional free radical polymerization of the main polymerization reaction.

Following the completion of the main polymerization reaction, one or more doses of oxidizing agent and reducing agent may be added to the reactor, often with heating, and the resulting polymerization reaction is normally allowed to continue for an additional time period. In some embodiments, the reaction is allowed to run for as long as 24 hours. In other embodiments, the reaction will be allowed to run for an additional 6 hours. In general, a 6-24 hour reaction time has been found to be sufficient for the acrylate polymers described herein. The free radicals generated by the reaction of the additional oxidizing and reducing agents are typically reactive enough to reduce residual monomers levels below 500 ppm. In some embodiments, the residual monomers will be reduced to levels below 100 ppm, often to levels below 50 ppm, and sometimes to levels below 10 ppm. In some embodiments, the oxidizing agents and reducing agents will be sufficiently decomposed following their use in driving additional polymerization so that they will leave little or no undesirable material in the polymer solution.

It will be appreciated that the present invention encompasses processes that includes a single purification reaction step (e.g., a single addition of oxidizing agent and a single addition of reducing agent) as well as multiple purification reaction steps (e.g., two or more steps adding oxidizing agent and reducing agent). It will be appreciated that the oxidizing agents and/or reducing agents used in any purification reaction step may be the same as or different from other purification reaction steps. The purification reaction step(s) facilitates additional polymerization of polymerizable material to provide a second reaction product comprising the polymer, remaining unreacted monomer, if any, and non-polymerizable materials, all in solution in an appropriate solvent.

In some embodiments for performing the purification reaction step, oxidizing agent and reducing agent are separately dissolved in suitable solvents to provide separate stock solutions of the oxidizing agent and reducing agent. Each of the stock solutions may be added to the initial reaction product to initiate further polymerization. In some embodiments, only one of the oxidizing agent or the reducing agent are dissolved in a suitable solvent to provide a stock solution that may be added to the initial reaction product. The remaining oxidizing or reducing agent may then be added directly to the initial reaction product. In some embodiments, an optional promoter is dissolved in a suitable solvent to provide a stock solution that also may be added to the initial reaction product.

In some embodiments, the oxidizing agent or oxidizing agent stock solution is added to the initial reaction product and the mixture is blended until homogeneous prior to addition of the reducing agent or reducing agent stock solution. In some embodiments, the reducing agent or reducing agent stock solution is added to the initial reaction product and the mixture is blended until homogeneous and prior to the addition of the oxidizing agent or oxidizing agent stock solution. In general, the oxidizing agent and the reducing agent are separately added to the initial reaction product to maximize polymerization efficiency. The oxidizing agent will react with the reducing agent directly and generate radicals to initiate further polymerization of the unreacted monomers. If no unreacted monomers remain in the initial reaction product, the radical created by reaction of the oxidizing agent and the reducing agent will be terminated without acting as initiators.

After the purification reaction step(s), the invention optionally employs one or more precipitation steps to precipitate the polymer out of its solvent so that the polymer may be separated from additional unreacted monomer, if any, and from the non-polymerizable material dissolved in the solvent. Precipitation is intended to further purify the polymer and will typically follow the reaction purification step(s). One or more precipitation steps may be performed. In some embodiments, precipitation of the polymer is accomplished be varying the polarity of the solvent system in which the polymer is initially dissolved. For example, a copolymer of isooctyl acrylate/acrylamide (IOA/ACM) dissolved in ethyl acetate can be precipitated by the addition of a suitable amount of methanol to alter the polarity of the solvent until the solvent polarity is incompatible with that of the PSA polymer.

In some embodiments of the invention, two to three separate purification reaction step(s) may be performed followed by two to three precipitation steps to convert the original monomer to polymer and to remove the non-polymerizable materials as well. Precipitation of the initial reaction product is not desirable, since the typical level of 1 to 5% unreacted polymerizable material remaining after a conventional free radical polymerization is too high to be efficiently reduced by precipitation. The inclusion of a precipitation step becomes more desirable following one or more purification reaction steps where the level of residual unreacted polymerizable material is reduced below that remaining after a conventional free radical polymerization. The combination of purification reaction and precipitation may reduce the remaining monomer content in the final polymer (e.g., following purification reaction and precipitation) to less than about 200 ppm, often less than about 100 ppm, and sometimes less than about 10 ppm.

The combination of purification reaction and precipitation is also believed to reduce the remaining non-polymerizable material content in the final polymer (e.g., following purification reaction and precipitation) to less than about 200 ppm, often less than about 100 ppm, and sometimes less than about 50 ppm.

The purified polymers obtained from the invention are generally suitable for use in medical products which require adherence to human skin. In fact, the adhesives provided by the invention are generally suitable for use in direct contact with human skin.

Following one or more purification reactions (with or without one or more optional precipitation steps), the resultant acrylate (or methacrylate) copolymer may be blended with optional components such as compatible tackifying resins and/or plasticizers in order to optimize the tack and peel properties of the resulting pressure-sensitive adhesive (PSA) composition. Examples of useful tackifying resins include rosin, rosin derivatives, hydrogenated rosin derivatives, polyterpene resins, phenolic resins, coumarone-indene resins, and the like. Plasticizers that can be employed include the well-known extender oils (aromatic, paraffinic, or naphthenic), as well as a wide variety of liquid polymers. When used, tackifying resin is preferably added in an amount not to exceed about 150 parts by weight per 100 parts by weight copolymer, and plasticizer may be added in an amount up to about 50 parts by weight per 100 parts by weight copolymer.

Other optional components may be added to the adhesive formulations provided by the present invention. Exemplary of such additional ingredients include pigments, fillers, stabilizers, medicaments (also referred to here as drugs), pharmaceutically acceptable materials that may be used as skin penetration enhancers (i.e., substances that increase the permeation rate of a drug across or into the skin) or solubilizers (i.e., substances that effectively solubilize a drug) in transdermal drug delivery systems and various polymeric additives.

Exemplary drugs include any substance capable of local or systemic effect when administered to the skin. In a preferred embodiment, the drug will be capable of systemic effect when administered to the skin. Clonidine, estradiol, nicotine, nitroglycerine, scopolamine, and fentanyl, are examples of drugs commercially available in the form of transdermal devices. Others include anti-inflammatory drugs, both steroidal (e.g., hydrocortisone, prednisolone, triamcinolone) and nonsteroidal (e.g., naproxen, piroxicam); bacteriostatic agents (e.g., chlorhexidine, hexylresorcinol); antibacterials (e.g., penicillins such as penicillin V, cephalosporins such as cephalexin, erythromycin, tetracycline, gentamycin, sulfathiazole, nitrofurantoin, and quinolones such as norfloxacin, flumequine, and ibafloxacin); antiprotozoals (e.g., metronidazole); antifungals (e.g., nystatin); coronary vasodilators; calcium channel blockers (e.g., nifedipine, diltiazem); bronchodilators (e.g., theophylline, pirbuterol, salmeterol, isoproterenol); enzyme inhibitors such as collagenase inhibitors, protease inhibitors, elastase inhibitors, lipoxygenase inhibitors (e.g., A64077), and angiotensin converting enzyme inhibitors (e.g., captopril, lisinopril); other antihypertensives (e.g., propranolol); leukotriene antagonists (e.g., ICI204,219); anti-ulceratives such as H2 antagonists; steroidal hormones (e.g., progesterone, testosterone, estradiol); antivirals and/or immunomodulators (e.g., 1-isobutyl-1H-imidazo[4,5-c]quinolin-4-amine, 1-(2-hydroxy-2-methylpropyl)-1H-imidazo[4,5-c]quinolin-4-amine, and acyclovir); local anesthetics (e.g., benzocaine, propofol); cardiotonics (e.g., digitalis, digoxin); antitussives (e.g., codeine, dextromethorphan); antihistamines (e.g., diphenhydramine, chlorpheniramine, terfenadine); narcotic analgesics (e.g., morphine, buprenorphine); peptide hormones (e.g., human or animal growth hormones, LHRH); cardioactive products such as atriopeptides; proteinaceous products (e.g., insulin); enzymes (e.g., antiplaque enzymes, lysozyme, dextranase); antinauseants; anticonvulsants (e.g., carbamazine); immunosuppressives (e.g., cyclosporine); psychotherapeutics (e.g., diazepam); sedatives (e.g., phenobarbital); anticoagulants (e.g., heparin); analgesics (e.g., acetaminophen); antimigraine agents (e.g., ergotamine, melatonin, sumatripan); antiarrhythmic agents (e.g., flecainide); antiemetics (e.g., metaclopromide, ondansetron); anticancer agents (e.g., methotrexate); neurologic agents such as anxiolytic drugs; hemostatics; anti-obesity agents; and the like, as well as pharmaceutically acceptable salts and esters thereof. The amount of drug that constitutes a therapeutically effective amount can be readily determined by those skilled in the art with due consideration of the particular drug, the particular carrier, and the desired therapeutic effect.

Exemplary skin penetration enhancers and/or solubilizers include $C_8$-$C_{20}$ fatty acids such as isostearic acid, octanoic acid, and oleic acid; $C_8$-$C_{20}$ fatty alcohols such as oleyl alcohol and lauryl alcohol; lower alkyl esters of $C_8$-$C_{20}$ fatty acids such as ethyl oleate, isopropyl myristate, butyl stearate, and methyl laurate; di(lower) alkyl esters of $C_6$-$C_8$ diacids such as diisopropyl adipate; monoglycerides of $C_8$-$C_{20}$ fatty acids such as glyceryl monolaurate; tetraglycol (tetrahydrofurfuryl alcohol polyethylene glycol ether); tetraethylene glycol (ethanol,2,2'-(oxybis(ethylenoxy))diglycol); $C_6$-$C_{20}$ alkyl pyrrolidone carboxylates; polyethylene glycol; propylene glycol; 2-(2-ethoxyethoxy)ethanol; diethylene glycol monomethyl ether; N,N-dimethyldodecylamine-N-oxide and combinations of the foregoing. Alkylaryl ethers of polyethylene oxide, polyethylene oxide monomethyl ethers, polyethylene oxide dimethyl ethers, glycerol, and N-methyl pyrrolidone are also suitable. The terpenes are another useful class of pharmaceutical excipients, including pinene, d-limonene, carene, terpineol, terpinen-4-ol, carveol, carvone, pulegone, piperitone, menthone, menthol, neomenthol, thymol, camphor, borneol, citral, ionone, and cineole, alone or in any combination.

In addition to adhesive compositions, coated sheet materials may also be provided comprising a backing member and an adhesive coating, the coating comprising the acrylate (or methacrylate) composition described herein and covering at least a portion of one major surface of the backing member. Specific products are provided that comprise such a coated sheet material such as, for example, rolls of tape, transfer tapes, adhesive bandages, transdermal patches and the like. A roll of tape comprises a flexible backing sheet having at least one major surface coated with the adhesive described herein. The transfer tape comprises a film of the adhesive composition on at least one release liner.

In some embodiments, the coated sheet materials are provided in the form of adhesive bandages. The adhesive bandages may comprise any of a variety of constructions wherein the bandage includes a backing material with the adhesive described herein coated on one of the major surfaces of the backing to facilitate ability of the bandage to adhere to human skin. The adhesive described herein is generally suitable for use in wound dressings or bandages.

In some embodiments, the coated sheet materials are provided in the form of a transdermal patch suitable for the continuous transdermal delivery of a therapeutically effective amount of an appropriate medicament. Suitable transdermal drug delivery devices include gelled or liquid reservoirs, such as in U.S. Pat. No. 4,834,979 (Gale), so-called "reservoir" patches; devices containing matrix reservoirs attached to the skin by an adjacent adhesive layer, such as in U.S. Pat. No. 6,004,578 (Lee, et al.), so-called "matrix" patches; and devices containing PSA reservoirs, such as in U.S. Pat. Nos. 6,365,178 (Venkateshwaran et al.), U.S. Pat. No. 6,024,976 (Miranda et al.), U.S. Pat. No. 4,751,087 (Wick) and U.S. Pat. No. 6,149,935 (Chiang et al.), so-called "drug-in-adhesive" patches, the disclosures of which are incorporated in their entirety herein by reference thereto.

In one embodiment, transdermal patches according to the invention comprise (a) a flexible backing; (b) the adhesive described herein coated on at least one major surface of the flexible backing; and (c) nitroglycerin in an amount suitable for substantially continuous transdermal delivery to a subject over a prolonged period in an amount which is therapeutically effective. The adhesive coating for the transdermal patch may optionally comprise a skin penetration enhancer such as a combination of (i) a fatty acid ester prepared from a fatty acid containing about 14 to 20 carbon atoms and an alkyl alcohol containing 2 to about 6 carbon atoms and a single hydroxyl, and (ii) glyceryl monolaurate, the fatty acid ester being present in an amount by weight of about 1 to 30 percent of the total weight of the adhesive coating, and glyceryl monolaurate being present in an amount by weight of about 0.2 to 5 percent of the total weight of the adhesive coating. When such a skin penetration enhancing combination is employed, the nitroglycerin content in the adhesive coating may be about 10 to 45 percent by weight of the total weight of the adhesive coating.

The adhesive compositions according to the present invention are easily coated upon suitable flexible or inflexible backing materials by conventional coating techniques to produce Pressure sensitive adhesive (PSA) coated sheet materials. The flexible backing may be of any material which may be utilized as a tape or a backing appropriate for adhesive backing or may be of any other flexible material. Representative examples of flexible tape backing materials include paper, plastic films such as poly(propylene), poly(ethylene), poly(vinyl chloride), polyester e.g., poly(ethylene terephthalate), cellulose acetate, and ethyl cellulose. Backings may also be of woven fabric formed of threads of synthetic or natural materials such as cotton, nylon, rayon, glass, or ceramic material, or they may be of a nonwoven fabric such as air-laid webs of natural or synthetic fibers or blends of these. In addition, the backing may be formed of metal, metallized polymeric film, or ceramic sheet material. The PSA composition may also be coated as films on a suitable release liner to provide an adhesive transfer film.

The PSA compositions provided by the present invention may be coated onto a surface by any of a variety of conventional coating techniques such as roll coating, knife coating, or curtain coating. Primers may be used, but they are not always necessary. The resultant coatings do not require curing or crosslinking. However, if enhancement of resistance to solvents, etc., is desired, crosslinking may be effected by standard methods well-known in the art, such as radiation curing (electron beam or ultraviolet light) or chemical crosslinking.

EXAMPLES

Test Methods

Residual N,N-dimethylaminoethyl acrylate dimethyl sulfate quaternary (DMAEAMS) and methoxylated poly(ethylene glycol) acrylate (AM-90G from San Esters) were measured by high performance liquid chromatography (HPLC) using an Agilent LC-MSD with MS detector, column: Hamilton PRP-1,5 µm, 150×2.1 mm. Standards of the two monomers were made in 50/50 water/acetonitrile with concentration ranging from 100 to 0.1 µg/mL. The standards were analyzed and calibration curves for each of the standards were made from a second order polynomial fit of peak area versus concentration. Residual DMAEAMS and the methoxylated poly(ethylene glycol) acrylate were reported as ppm based on dry polymer weight.

Residual acrylamide (ACM) was measured by gas chromatography (GC) using an HP 6890 Plus gas chromatograph with a Flame Ionization Detector (FID), an HP 7683A automatic sampler, and a 30 m HP-Innowax capillary column. Standards were prepared between 10 ppm (w/v) and 10 ppb (w/v) in ethyl acetate spiked with an internal standard of 500 ppb (w/v) 1-methyl-2-pyrrolidinone (NMP). The samples were dissolved and diluted to 10% (w/v) in ethyl acetate spiked with 500 ppb (w/v) NMP. Residual acrylamide is reported as ppm based on dry polymer weight.

Residual isooctyl acrylate (IOA) was measured by gas chromatography (GC) using an HP 6890 Plus gas chromatograph with a Flame Ionization Detector (FID), an HP 7683A automatic sampler, and a 105 m Rtx-1701 capillary column. Standards were prepared between 100 ppm (w/v) and 100 ppb (w/v) in ethyl acetate spiked with an internal standard of 5 ppm (w/v) butyl acrylate (BA). The samples were dissolved and diluted to 10% (w/v) in ethyl acetate spiked with 5 ppm (w/v) BA.

Initial Reaction Product A1-A4

Four initial reaction products were prepared and designated A1, A2, A3, and A4. The products were pressure-sensitive adhesive copolymer solutions prepared from isooctyl acrylate and acrylamide (93:7) according to the general methods described in Examples 5 and 6 of U.S. Pat. No. 4,751,087.

The resulting copolymer solutions were 23% solids in a 90:10 blend of ethyl acetate and methanol. The inherent viscosity (IV) of each copolymer solution was 1.32 dL/g. Inherent viscosity was measured for a concentration of 0.15 g/dL in ethyl acetate at 27° C.

An aliquot of each polymer solution A1- A4 was tested by gas chromatography (GC) and the residual acrylamide level was obtained. The residual ACM and IV are shown in Table 1.

TABLE 1

| Copolymer Solution | IV [dL/g] | Residual ACM [ppm] |
| --- | --- | --- |
| A1 | 1.32 | 2029 |
| A2 | 1.35 | 1480 |
| A3 | 1.39 | 1644 |
| A4 | 1.39 | 1953 |

Initial Reaction Product B

An initial reaction product comprising a pressure-sensitive adhesive copolymer solution was prepared by mixing together 2-ethylhexyl acrylate (420 g), N,N-dimethylaminoethyl acrylate dimethyl sulfate quaternary (150 g solution, 80% in water, available as Ageflex FA1Q80DMS from Ciba), methoxylated poly(ethylene glycol) acrylate (60 g, available as AM-90G from San Esters), acetone (502 g), methanol (200 g) and 2,2'-azobis(2-methylbutanenitrile) (1.50 g) (commercially available from Du Pont under the trade designation VAZO-67). The resulting homogeneous solution was divided into four bottles at 333 g each. The bottles were purged with nitrogen, sealed, and heated in a water bath at 58° C. for 16 hours. The inherent viscosity of the resultant polymer solution was 0.43 dL/g. Inherent viscosity was measured for a concentration of 0.50 g/dL in tetrahydrofuran at 27° C.

Stock Solutions

Stock solutions of the following oxidizing agents, reducing agents, and promoters were prepared for use in the following examples.

TAHP: A 5% solids solution of tertiary amyl hydroperoxide was prepared by mixing a solution of 85% TAHP in water (5.88 g, available from Akzo Nobel) with methanol (94.12 g).

$VOSO_4$: A 0.5% solids solution of vanadyl sulfate hydrate ($VOSO_4$-$3H_2O$ solution) was prepared by adding $VOSO_4$-$3H_2O$ (0.50 g) to water (99.5 g).

Vitamin C: A 5% solids solution of vitamin C was prepared by adding vitamin C (5.0 g) to methanol (95.0 g).

TBHP: A 5% solids solution of tertiary butyl hydroperoxide was prepared by mixing a solution of 70% TBHP in water (7.14 g, available from Akzo Nobel) with ethanol (92.86 g).

SFS: A 5% solids solution of sodium formaldehydesulfoxide was prepared by adding sodium formaldehydesulfoxide (5.0 g) to water (95.0 g).

$FeSO_4$: A 0.50% solids solution of ferrous sulfate was prepared by adding ferrous sulfate (0.50 g) to water (99.5 g).

Example 1

Step 1: An aliquot of initial reaction product (Initial reaction product A2, 543.5 g solution, 125 g solids) was added to a 1-quart (0.95 L) amber glass bottle. To this solution was added TAHP solution (2.50 g solution, 0.125 g solids) and $VOSO_4$ solution (0.50 g solution, 0.0025 g solids). The bottle was closed and mixed for 10 minutes. Vitamin C solution (2.50 g solution, 0.125 g solids) was added to the bottle followed by a nitrogen purge to remove all of the oxygen. The bottle was sealed and heated in a water bath at 60° C. for 2 hours. It was allowed to cool down to ambient temperature.

Step 2: The bottle was unsealed and additional TAHP solution (2.50 g solution, 0.125 g solids) was added. The bottle was closed and mixed for 10 minutes. Additional Vitamin C solution (2.50 g solution, 0.125 g solids) was added to the bottle followed by a nitrogen purge to remove all of the oxygen. The bottle was then sealed and heated in a water bath at 60° C. for 2 hours. It was allowed to cool down to ambient temperature.

Step 3: The bottle was unsealed and additional TAHP solution (2.50 g solution, 0.125 g solids) was added. The bottle was closed and mixed for 10 minutes. Additional Vitamin C solution (3.75 g solution, 0.188 g solids) was added to the bottle followed by a nitrogen purge to remove all of the oxygen. The bottle was then sealed and heated in a water bath at 60° C. for 2 hours. It was allowed to cool down to ambient temperature.

Step 4: The bottle was unsealed and additional TAHP solution (2.50 g solution, 0.125 g solids) was added. The bottle was closed and mixed for 10 minutes. Additional Vitamin C solution (3.75 g solution, 0.188 g solids) was added to the bottle followed by a nitrogen purge to remove all of the oxygen. The bottle was then sealed and heated in a water bath at 60° C. for 24 hours. It was allowed to cool down to ambient temperature.

Residual acrylamide of the purified solution was measured by gas chromatography as being described above. (The amount of residual acrylamide was below the detection limit of 5 ppm. The total amount of oxidizing agents and reducing agents added (in ppm) and the total purification reaction time is shown in Table 2.

Examples 2 to 12

Aliquots of initial reaction products A1-A4 were treated as described in Example 1 with the following exceptions: some examples involved 3 reaction steps instead of 4, SFS was used in place of vitamin C in some examples, $FeSO_4$ was used in place of or in combination with $VOSO_4$. The total amount of oxidizing agents and reducing agents added (in ppm) and the total purification reaction time at each step is shown in Table 2.

TABLE 2

| Ex. No. | Step No. | Initial reaction product | TAHP [ppm] | Vitamin C [ppm] | SFS [ppm] | $VOSO_4$ [ppm] | $FeSO_4$ [ppm] | Reaction time [hr] | Residual ACM, [ppm]* |
|---|---|---|---|---|---|---|---|---|---|
| 1 | 1 | Example A2 | 1000 | 1000 | — | 20 | — | 2 | |
|   | 2 |  | 1000 | 1000 | — | — | — | 2 | |
|   | 3 |  | 1000 | 1500 | — | — | — | 2 | |
|   | 4 |  | 1000 | 1500 | — | — | — | 18 | N/D |
| 2 | 1 | Example A1 | 1000 | 1000 | — | 20 | — | 2 | |
|   | 2 |  | 1000 | 1000 | — | — | — | 2 | |
|   | 3 |  | 1000 | — | 1000 | — | — | 12 | N/D |
| 3 | 1 | Example A2 | 1000 | 1000 | — | 20 | — | 2 | |
|   | 2 |  | 1000 | 1000 | — | — | — | 2 | |
|   | 3 |  | 1000 | — | 1000 | — | — | 26 | 17 |
| 4 | 1 | Example A2 | 1000 | 1000 | — | 50 | — | 2 | 27 |
|   | 2 |  | 1000 | 1000 | — | — | — | 2 | |
|   | 3 |  | 1000 | — | 1000 | — | — | 32 | |
| 5 | 1 | Example A2 | 1000 | 1000 | — | 50 | — | 2 | |
|   | 2 |  | 1000 | 1000 | — | — | — | 2 | |
|   | 3 |  | 1000 | — | 1000 | — | — | 22 | N/D |
| 6 | 1 | Example A2 | 1000 | 1000 | — | 50 | — | 2 | |
|   | 2 |  | 1000 | 1000 | — | — | — | 2 | |
|   | 3 |  | 1000 | 1000 | — | — | — | 2 | N/D |
|   | 4 |  | 1000 | — | 1000 | — | — | 24 | |
| 7 | 1 | Example A2 | 1000 | 1000 | — | 50 | 50 | 2 | |
|   | 2 |  | 1000 | 1000 | — | — | — | 2 | |
|   | 3 |  | 1000 | 1000 | — | — | — | 2 | N/D |
|   | 4 |  | 1000 | — | 1000 | — | — | 24 | |
| 8 | 1 | Example A3 | 1000 | 1000 | — | 20 | — | 2 | |
|   | 2 |  | 1000 | 1000 | — | — | — | 2 | |
|   | 3 |  | 1000 | 1500 | — | — | — | 2 | N/D |
|   | 4 |  | 1000 | 1500 | — | — | — | 24 | |
| 9 | 1 | Example A3 | 1000 | 1000 | — | 20 | — | 2 | |
|   | 2 |  | 1000 | 1000 | — | — | — | 2 | |
|   | 3 |  | 1000 | 1500 | — | — | — | 2 | N/D |
|   | 4 |  | 1000 | 1500 | — | — | — | 6 | |
| 10 | 1 | Example A3 | 1000 | 1000 | — | 20 | — | 2 | N/D |
|    | 2 |  | 1000 | 1000 | — | — | — | 2 | |
|    | 3 |  | 1000 | 1500 | — | — | — | 8 | |
| 11 | 1 | Example A4 | 1000 | 1000 | — | 20 | — | 2 | N/D |
|    | 2 |  | 1000 | 1000 | — | — | — | 2 | |
|    | 3 |  | 1000 | 1500 | — | — | — | 2 | |
|    | 4 |  | 1000 | 1500 | — | — | — | 6 | |
| 12 | 1 | Example A4 | 1000 | 1000 | — | 20 | — | 2 | N/D |
|    | 2 |  | 1000 | 1000 | — | — | — | 2 | |
|    | 3 |  | 1000 | 1500 | — | — | — | 8 | |

*N/D - below detection limit of 5 ppm

Example 13

Precipitation cycle 1: To an aliquot of the purified initial reaction product (Example 4, 203 g solution, 46.7 g solids, residual IOA: 550, ACM: 27 ppm based on dry polymer weight) was added methanol (100 g) to precipitate the polymer. This mixture was shaken at ambient temperature for 3 hours to ensure that residual monomers reached equilibrium between the solvent and the precipitated polymer phase. The solvent phase (165 g) was then phase separated from the precipitated polymer. To the polymer was added ethyl acetate (65 g) to redissolve the polymer into a clear solution.

Precipitation cycle 2: To this solution was added another dose of methanol (100 g) to precipitate the polymer, followed by shaking for another 3 hours to wash the precipitated polymer. Solvents (163 g) were separated from the polymer. Ethyl acetate (63 g) was added to redissolve the polymer into the clear solution. This sample was analyzed for residual IOA and ACM by GC. Residual IOA and ACM results, both before and after precipitation, are shown below in Table 3. Results are summarized in Table 3.

Example 14-16

Samples were prepared using the same procedures as described above in Example 13 with the exception that the starting purified initial reaction product was varied and three precipitation cycles were performed. The starting purified initial reaction product, number of precipitation cycles, and residual IOA and ACM, both before and after precipitation, are shown below in Table 3.

TABLE 3

| Ex. No. | Starting purified initial reaction product | Residual IOA/ACM Before Precipitation [ppm] | Precipitation Cycles | Residual IOA/ACM After Precipitation [ppm] |
|---|---|---|---|---|
| 13 | Example 4 | 550/27 | 2 | 160/ND |
| 14 | Example 8 | 503/ND | 3 | 46/ND |
| 15 | Example 9 | 384/ND | 3 | 44/ND |
| 16 | Example 10 | 392/ND | 3 | 80/ND |

*N/D - below detection limit of 5 ppm

Example 17

An aliquot of initial reaction product B (333 g, 150 g solids) was added to a 1-quart (0.95 L) amber glass bottle. To this solution was added TBHP solution (3.0 g solution, 0.15 g solids). The bottle was mixed at ambient temperature for 20 min to ensure that it was homogeneous. SFS solution (3.0 g solution, 0.15 g solids) was added to the bottle followed by a nitrogen purge to remove all of the oxygen. The bottle was sealed and heated in a water bath at 60° C. for 2 hours. It was allowed to cool down to ambient temperature.

The bottle was unsealed and additional TBHP solution (3.0 g solution, 0.15 g solids) was added. The bottle was mixed at ambient temperature for 20 min. Additional SFS solution (3.0 g solution, 0.15 g solids) was added to the bottle followed by a nitrogen purge to remove all of the oxygen. The bottle was sealed and heated in a water bath at 60° C. for 2 hours.

Residual DMAEAMS and AM-90G were measured by HPLC at 90 ppm and 330 ppm, respectively.

An aliquot of untreated copolymer B solution was tested by HPLC and residual DMAEAMS and AM-90G were 3500 ppm and 2900 ppm, respectively.

Example 18

A pressure-sensitive adhesive copolymer solution was prepared by adding butyl acrylate (18.0 g), DMAEAMS (2.5 g, 80% in water), acetone (26 g), methanol (20 g) and VAZO-67 (0.06 g) to a 4-oz glass bottle and mixing until homogeneous. The bottle was purged with nitrogen, sealed and heated at 57° C. for 24 hours. The resultant copolymer solution was diluted to 30% solids by addition of a 1.3:1 mixture of acetone/methanol (8.0 g).

A TAHP solution (1000 ppm, 0.36 g solution, 0.018 g solids) was added to the copolymer solution and mixed for 10 minutes. Vitamin C solution (0.36 g solution, 0.018 g solids) and 2 drops of a 1% aqueous $VOSO_4$ solution were added to the bottle followed by a nitrogen purge to remove all of the oxygen. The bottle was sealed and heated in a water bath at 57° C. for 2 hours. It was allowed to cool down to ambient temperature.

Additional TAHP solution (1000 ppm, 0.36 g solution, 0.018 g solids) was added to the copolymer solution and mixed for 10 minutes. Additional vitamin C solution (1000 ppm, 0.36 g solution, 0.018 g solids) was added to the bottle followed by a nitrogen purge to remove all of the oxygen. The bottle was sealed and heated in a water bath at 57° C. for 2 hours.

Additional TAHP solution (800 ppm, 0.29 g solution, 0.0144 g solids) was added to the copolymer solution and mixed for 10 minutes. Additional vitamin C solution (800 ppm, 0.29 g solution, 0.0144 g solids) was added to the bottle followed by a nitrogen purge to remove all of the oxygen. The bottle was sealed and heated in a water bath at 57° C. for 2 hours.

Residual DMAEAMS was measured by HPLC at 259 ppm.

What is claimed:

1. A method for the manufacture of a pressure sensitive adhesive, comprising:
   (A) Providing an initial reaction product of a solution polymerization reaction, the initial reaction product comprising a pressure sensitive adhesive polymer, unreacted polymerizable reactant, non-polymerizable material, and solvent; and
   (B) Purifying the initial reaction product by adding an oxidizing agent and a reducing agent to the initial reaction product and allowing the unreacted polymerizable reactant in the initial reaction product to further react, thereby providing a second reaction product comprising additional pressure sensitive adhesive polymer and a lower level of unreacted polymerizable reactant than was present in the initial reaction product, with the proviso that the level of unreacted polymerizable reactant in the second reaction product is less than about 100 ppm.

2. The method as defined in claim 1 wherein step (A) of providing an initial reaction product of a solution polymerization reaction comprises polymerizing a primary acrylate monomer comprising a $C_4$ to $C_{12}$ alkyl acrylate.

3. The method as defined in claim 1 wherein step (A) of providing an initial reaction product of a solution polymerization reaction comprises polymerizing a primary acrylate monomer comprising an alkyl acrylate and a polar monomer.

4. The method as defined in claim 3 wherein the primary acrylate monomer is selected from the group consisting of isooctyl acrylate, 2-ethylhexyl acrylate, 2-methyl butyl acrylate, butyl acrylate and combinations of two or more of the foregoing.

5. The method as defined in claim 4 wherein the polar monomer is selected from the group consisting of acrylamide, methacrylamide, N-vinyl-2-pyrrolidone, 2-hydroxyethylacrylate, hydroxypropylacrylate, acrylic acid, methacrylic acid, pyrrolidonyl ethyl acrylate, 2-carboxyethylacrylate, and combinations of two or more of the foregoing.

6. The method as defined in claim 1 wherein a free radical is generated by reaction of the oxidizing agent with the reducing agent.

7. The method as defined in claim 1 wherein the oxidizing agent is an alkyl hydroperoxide selected from the group consisting of tertiary amyl hydroperoxide, tertiary butyl hydroperoxide and combinations of two or more of the foregoing.

8. The method as defined in claim 1 wherein the reducing agent is selected from the group consisting of alkylamines, sodium formaldehydesulfoxide, Vitamin C and combinations of two or more of the foregoing.

9. The method as defined in claim 1 wherein step (B) of purifying the initial reaction product further comprises adding a promoter to the initial reaction product.

10. The method as defined in claim 9 wherein the promoter comprises a transition metal salt selected from the group consisting of vanadyl sulfate hydrate, ferrous sulfate and combinations of two or more of the foregoing.

11. The method as defined in claim 1, further comprising the steps of
Precipitating the polymer from the second reaction product to provide a precipitated polymer; and
Separating the precipitated polymer from the remainder of the second reaction product, the precipitated polymer comprising a lower level of non-polymerizable material or unreacted polymerizable reactant or both non-polymerizable material and unreacted polymerizable reactant than was present in the second reaction product.

12. The method as defined in claim 11 wherein precipitating the polymer from the second reaction product comprises modifying the polarity of the solvent until the polymer is no longer soluble therein.

13. The method as defined in claim 11 wherein the precipitated polymer comprises a level of unreacted polymerizable reactant of less than about 50 ppm.

14. A method for the manufacture of a pressure sensitive adhesive copolymer, comprising:
(A) Providing an initial reaction product of a solution polymerization reaction, the initial reaction product comprising a pressure sensitive adhesive copolymer of isooctyl acrylate and acrylamide, unreacted polymerizable reactant, non-polymerizable material, and solvent;
(B) Purifying the initial reaction product by adding an oxidizing agent and a reducing agent to the initial reaction product and allowing the unreacted polymerizable reactant in the initial reaction product to further react, thereby providing a second reaction product comprising additional pressure sensitive adhesive copolymer and a lower level of unreacted polymerizable reactant than was present in the initial reaction product; and
(C) Precipitating the non-polymerizable material from the reaction product to provide a purified pressure sensitive adhesive copolymer of isooctyl acrylate and acrylamide comprising less than about 100 ppm of unreacted isooctyl acrylate or acrylamide.

* * * * *